Feb. 2, 1971 N. E. WICKLIFF 3,560,878

CONSTANT FREQUENCY AMPLITUDE-TO-PULSE WIDTH CONVERTER

Filed June 27, 1968 2 Sheets-Sheet 1

INVENTOR
N. E. WICKLIFF
BY
Walter M. Hill
ATTORNEY

United States Patent Office 3,560,878

Patented Feb. 2, 1971

3,560,878

CONSTANT FREQUENCY AMPLITUDE-TO-PULSE WIDTH CONVERTER

Noble E. Wickliff, Winston-Salem, N.C., assignor to Bell Telephone Laboratories, Incorporated, Murray Hill and Berkeley Heights, N.J., a corporation of New York Filed June 27, 1968, Ser. No. 740,747
Int. Cl. H03k *3/282*
U.S. Cl. 331—113 5 Claims

ABSTRACT OF THE DISCLOSURE

A pair of capacitors are caused to alternately charge at a constant rate through the base-emitter paths of a pair of transistors until their voltages reach first and second variable threshold voltages, respectively. At the instant each capacitor reaches its threshold voltage, it is abruptly discharged and the other capacitor starts to charge. Rectangular voltage waveforms of opposite phase appear across resistors in the collector circuits of the transistors. The widths of the pulses in the waveforms are controlled by the threshold voltages. By maintaining the sum of the threshold voltages constant, the frequency of the waveforms will be constant regardless of pulse width.

GOVERNMENT CONTRACT

The invention herein claimed was made in the course of, or under contract with the Department of the Army.

BACKGROUND OF THE INVENTION

This invention relates to the art of pulse width modulation and, more particularly, to an amplitude-to-pulse width converter of the pulse width modulator type.

Pulse width modulators of the prior art, also known as amplitude-to-pulse width converters, generally do not operate at a constant frequency and many of them, particularly those employing a Schmitt trigger circuit, exhibit an undesirable hysteresis effect as described in an article by M. B. Leeds in the September 1963 issue of Electro-Technology, pages 43–45. These modulators are not only useful for pulse transmission signalling systems, but also for the switching control means for regulated direct voltage power supplies. When applied to the latter, use, it is particularly desirable that the switches operate at a substantially constant frequency and only the relative duration of the switch closure be made variable. There are at least four advantages in operating the switches at a constant frequency. First, the filtering problem is considerably simplified because the filter may be designed for a single frequency rather than for a range of frequencies. Second, a maximum bandwidth in the feedback amplifier is more easily obtained at a single frequency without the risk of closed loop oscillations or loss of control over the output voltage. Third, the maximum power dissipation in the series switching element is more predictable at a constant frequency so its heat sink need be no larger than necessary for normal operation. A larger heat sink would generally be necessary if the frequency were allowed to vary. Fourth, the risk of developing undesirable beats between the switching frequency and the frequency of the alternating current source supplying the rectifier or between their harmonics is reduced. Such beats may be too low in frequency to be adequately filtered by the output filter.

SUMMARY OF THE INVENTION

This invention comprises an amplitude-to-pulse width converter which produces a substantially constant frequency, hysteresis free, rectangular voltage waveform, the widths of its pulses being proportional to a change in a control voltage. The emitter-base path of each of two transistors is connected across a direct voltage source in series with a capacitor and a constant current means, thereby causing linear charging of each capacitor as its associated transistor conducts. The two transistors alternately conduct for periods controlled by two control voltage sources, each source being connected in series opposition to the voltage charge on its capacitor. When the voltage of the capacitor that is charging slightly exceeds its control voltage, circuitry, including auxiliary transistors, switches conduction between the two transistors after the fashion of a multivibrator. The two control voltages change differentially by equal increments, thereby maintaining a constant frequency.

BRIEF DESCRIPTION OF THE DRAWINGS

The invention may be better understood by reference to the accompanying drawings, in which.

DETAILED DESCRIPTION

Figure 1:
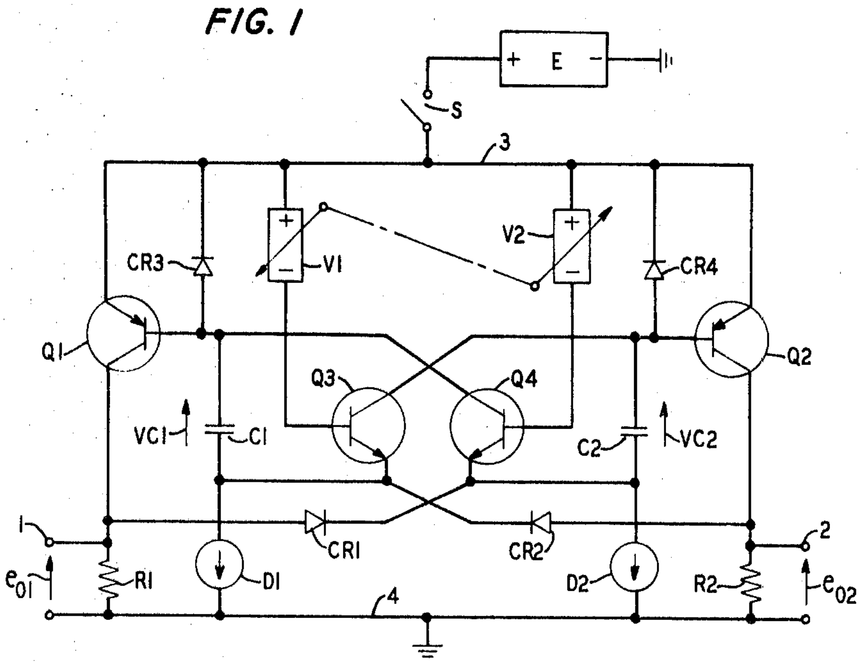
FIG. 1 discloses the essential circuits of a preferred embodiment of the invention.

Referring to FIG. 1, the collectors of transistors Q1 and Q2 are connected in series with resistors R1 and R2, respectively. The emitters of these two transistors are connected to conductor 3 leading to one terminal of direct voltage source E through a switch S. The other terminal of the direct voltage soucre is grounded and returns to the lower terminal of resistors R1 and R2 by way of grounded conductor 4. A first capacitor C1 and a first constant current means D1 are connected in series with the base-emitter path of transistor Q1, this series circuit being connected between conductors 3 and 4 and consequently across the direct voltage source E when switch S is closed. Similarly, a second capacitor C2 and constant current means D2 are connected in series with the base-emitter path of the second transistor Q2, which series circuit is also connected between conductors 3 and 4. By reason of the constant current characteristics of devices D1 and D2, their capacitors C1 and C2 will be caused to charge linearly when the base-emitter paths of their associated transistors Q1 and Q2 are conductive. Consequently, the voltage VC1, appearing across the first capacitor C1, will increase linearly with time, the upper terminal being positive as indicated by the voltage arrow alongside the capacitor. Similarly, capacitor C2 will have a voltage VC2 appearing across it which will also increase linearly with time. A series circuit including capacitor C1 may also be traced through a diode CR3, a variable voltage source V1, the base-emitter path of a third transistor Q3 and back to capacitor C1. A similar series circuit may be traced through the base-emitter path of a fourth transistor Q4, the second capacitor C2, a diode CR4 and a second variable voltage source V2. Voltage sources V1 and V2 provide threshold voltages and are made variable in the opposite sense so that their sum always remains constant. The effect of this is that an incremental change of voltage across one of these sources will result in an equal but opposite incremental change across the other source. This is symbolized by the dotted line connecting the two arrows through these sources suggesting their variability.

By reason of the series circuits just described, it will be evident that when the charge on either capacitor C1 or C2 only very slightly exceeds the threshold voltage of its assocated control voltage source, conduction will immediately start through the base-emitter path of its associated transistor Q3 or Q4. For example, should transistor Q1 be conducting, capacitor C1 will be charging and when its voltage VC1 slightly exceeds the threshold voltage V1, a current will flow from capacitor C1 through diode CR3, voltage source V1, through the base-emitter path of transistor Q3 in its forward direction and back to capacitor C1. The same kind of action takes place when voltage VC2 slightly exceeds the threshold voltage V2, in which case conduction takes place through a similar circuit including the base-emitter path of transistor Q4.

Diode CR1 is connected between the collector of transistor Q1 and the emitter of transistor Q4 and another diode CR2 is similarly connected between the collector of transistor Q2 and the emitter of transistor Q3. With the circuits just described, a sequence of operations may be readily followed.

Although the circuit of FIG. 1 is of symmetrical construction, perfect symmetry and equality of corresponding parts never exists in practice. Consequently, if switch S is closed, one of the transistors Q1 or Q2 will start conducting first. Let it be assumed that, because of this dissymmetry, transistor Q1 starts conduction and saturates before transistor Q2 can saturate. Transistor Q1 conducts due to base-emitter current flowing from source E through switch S, conductor 3, the base-emitter path of transistor Q1, capacitor C1, constant current means D1 and back to the grounded side of source E. The collector current from transistor Q1 flows through resistor R1 to produce thereacross the output voltage $e_{01}$. Since transistor Q1 is saturated, this output voltage will very closely approximate the supply voltage of source E. It can be shown, from an analysis of the circuit, that when transistor Q1 saturates, transistor Q2 cannot maintain conduction. The circuit action is closely similar to that of a conventional multivibrator with transistors Q1 and Q2 alternately conducting.

Assume that the circuit has been operating long enough for the initial transients to subside and that transistor Q1 has just become conductive. Capacitor C1 now charges linearly from current through the base-emitter path of transistor Q1 and the constant current means D1 as previously described. At the instant capacitor C1 begins to charge, voltage VC1 is substantially zero, so that the emitter of transistor Q3 stands at a voltage approximately equal to the voltage of source E with reference to ground. This is illustrated in the upper waveform of FIG. 2 where the voltage waveform $V_{e3}$ is shown to stand at a voltage equal to E volts at the time *t*0. As the voltage VC1 increases with time, the emitter voltage $V_{e3}$ lowers with reference to ground. When voltage VC1 equals or only slightly exceeds the threshold voltage V1, current starts to flow from capacitor C1 through diode CR3, source V1 and the base-emitter path of transistor Q3, thereby causing transistor Q3 to become conductive. This will occur at the instant of time *t*1 shown in the upper diagram of FIG. 2. When transistor Q3 starts conduction, a strong current pulse is driven through the base-emitter junction of transistor Q2 coming from source E by way of conductor 3, through the base-emitter junction of transistor Q2, through the collector-emitter path of transistor Q3 and back to source E by way of the constant current means D1. The voltage across constant current source D1 at this instant is less than the source voltage E by the voltage VC1 across capacitor C1.

The strong current pulse through the base-emitter path of transistor Q2 immediately causes this transistor to conduct through two paths. One path is through the base-emitter path of transistor Q2, capacitor C2 and constant current device D2, thereby starting a constant current charge of capacitor C2. The other path is through the emitter-collector path of transistor Q2 and through resistor R3 in parallel with the series circuit of diode CR2 and constant current means D1. The current from transistor Q2 thus flowing through constant current means D1 causes the voltage at its upper terminal, and consequently at the emitter of transistor Q3, to sharply rise until it closely approximates the voltage of source E, thereby promptly turning both transistors Q3 and Q1 off. At the same time, capacitor C1 is caused to abruptly discharge through a circuit path including diode CR3, the emitter-collector path of transistor Q2 and diode CR2.

The effect of the abrupt discharge of capacitor C1 will be observed by again referring to FIG. 2. At the instant *t*1, the discharge of capacitor C1 causes the voltage $V_{e3}$ at the emitter of transistor Q3 to suddenly rise until it approximates the voltage of source E while, at the same time, the voltage $V_{e4}$ at the emitter of transistor Q4 lowers linearly with time as capacitor C2 charges. Also, at instant *t*1, the output voltage $e_{01}$ at output terminal 1 abruptly lowers from a voltage about equal to that of source E to zero volts as represented by the next to bottom waveform in FIG. 2 while the voltage $e_{02}$ at output terminal 2 abruptly rises from zero volts to a voltage closely approximating the source voltage E. This condition will continue until time *t*2 when the voltage $V_{e4}$ at the emitter of transistor Q4 reaches the voltage $V_{b4}$ at the base of transistor Q4. This, of course, occurs when voltage VC2 across capacitor C2 equals the threshold voltage V2. At this instant, transistor Q4 becomes conductive and causes the voltage $V_{e4}$ at its emitter to promptly rise to a voltage closely aproximating the voltage of source E.

Figure 2:
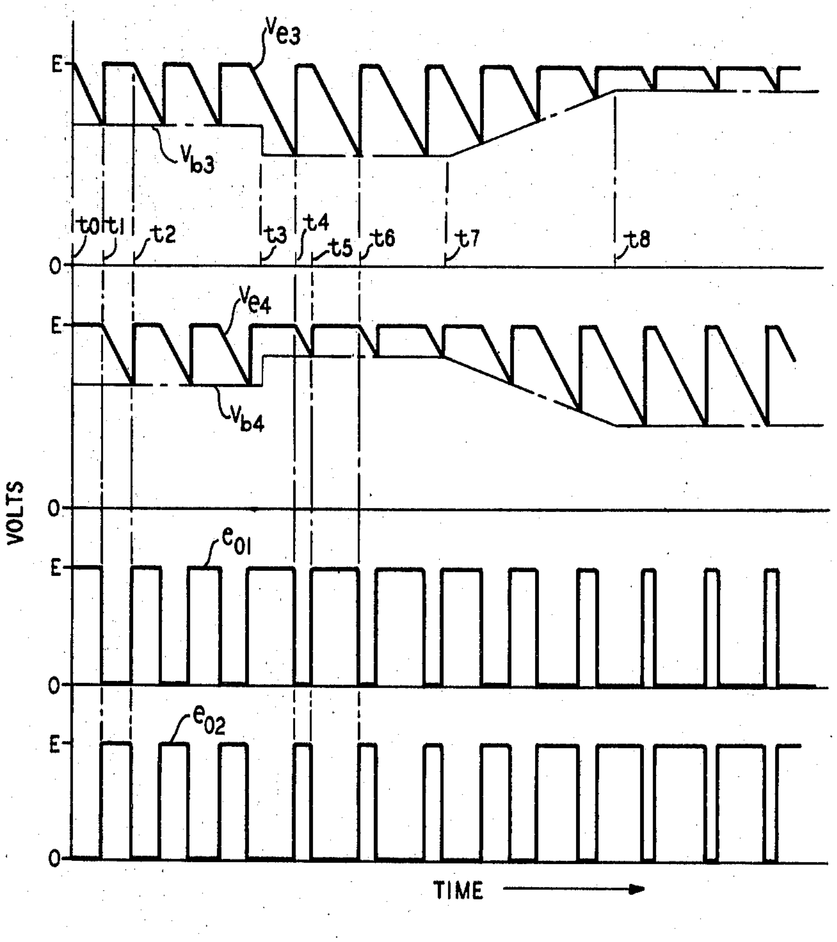
FIG. 2 discloses voltage waveforms with reference to ground as they appear at various points in the circuit of FIG. 1 and are useful in describing the operation of the invention.

The operating sequence described above repeats with transistors Q1 and Q2 alternately conducting to develop the two lower waveforms shown in FIG. 2 at the output terminals 1 and 2, respectively. At the instant *t*3, the voltage $V_{b3}$ at the base of transistor Q3 is suddenly lowered while the voltage $V_{b4}$ at the base of Q4 is increased by an equal amount. Up to this time, these voltages were equal so that the waveforms appearing at terminals 1 and 2 were of equal duration as indicated in the two lower diagrams of FIG. 2. However, after instant *t*3, the voltage $V_{e3}$ at the emitter of transistor Q3 will have to continue to lower until it reaches the new lower voltage level at the base of this transistor. This occurs at the instant *t*4. Since this took a longer period of time, the pulse appearing at terminal 1 will be of longer duration as shown in the $e_{01}$ waveform for the period ending at time *t*4. As before, when the emitter voltage reaches that of the base voltage, transistor Q3 starts conduction to cause the emitter voltage to promptly return to a voltage closely approximately the source voltage E and at the same instant capacitor C2 starts to charge, thereby developing the decreasing ramp voltage in the waveform $V_{e4}$ starting at time *t*4. As the emitter voltage $V_{e4}$ of transistor Q4 will now reach its base voltage $V_{b4}$ in a shorter time, the interval between *t*4 and *t*5 is shorter and, consequently, the voltage pulse appearing at output terminal 2 is of shorter duration as indicated in the $e_{02}$ diagram in FIG. 2. These pulse widths will continue to exist until the instant *t*7, when the voltages at the bases of transistors Q3 and Q4 are both gradually changed in opposite directions until the instant *t*8.

It should again be pointed out at this time that these changes in the base voltages of transistors Q3 and Q4 are brought about by changing the control or threshold voltages of sources V1 and V2. Since these threshold voltage sources are arranged to maintain their voltage sum constant, it is evident that as one increases the other will decrease by the same amount to effect the required change in base voltages on transistors Q3 and Q4. It can be shown that when the sum of these threshold voltages is kept constant, the frequency of the two lower waveforms shown in FIG. 2 remain constant notwithstanding the fact that the widths of their pulses are made to vary.

Figure 3:
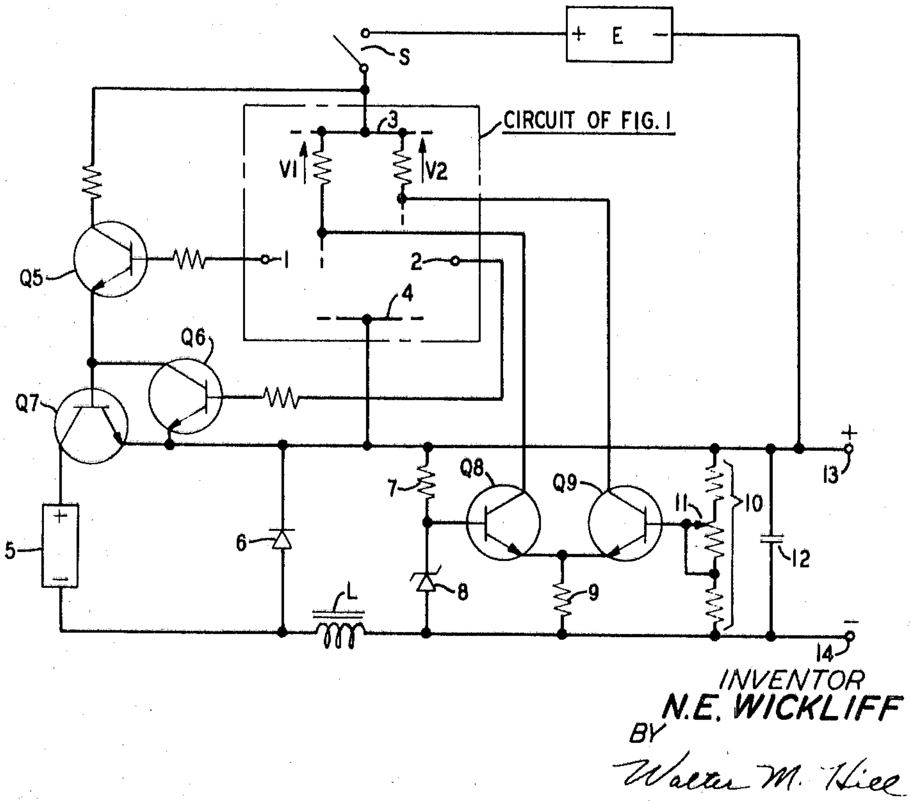
FIG. 3 discloses circuits showing the invention applied to the control of a direct voltage regulated power supply.

FIG. 3 shows an application of the present invention for controlling a direct voltage regulated supply of conventional configuration. The basic regulator circuit is shown in the lower portion of FIG. 3 and comprises generally a direct voltage source 5, a transistor switch Q7, diode 6, inductor L, the control network comprising resistor 7, Zener diode 8 and potential divider 10, filter capacitor 12 and output terminals 13 and 14. A detailed description of this circuit and its operation is unnecessary as it is well known and has been described in an article appearing in *solid/state/design* for April 1963, pages 30–34 by R. D. Loucks entitled "Considerations in the Design of Switching Type Regulators." Very briefly, however, the circuit operates as follows: When Q7 is made conductive, current from source 5 flows to output terminals 13 and 14 through the inductor L and, when this switch is subsequently opened, a current from inductor L continues to flow through diode 6 to terminals 13 and 14. The output voltage at terminals 13 and 14 depends upon the fraction of each switching cycle that transistor switch Q7 is closed.

The circuit of FIG. 1 is represented by the dotted rectangle in FIG. 3. Only fragmentary views of conductors 3 and 4 are shown and the threshold voltage sources V1 and V2 are shown as derived from voltage drops in a pair of resistors. Voltage V1 is determined by the current which flows from source E through switch S, conductor 3 to the resistor associated with source V1 and down through the collector-emitter path of transitor Q8, emitter resistor 9 and back to source E by way of the output circuit of the regulator. Similarly, the voltage V2 is obtained by current flowing through its resistor and through a similar path including transistor Q9. It is evident that the voltages V1 and V2 will be determined by the current permitted to flow by transistors Q8 and Q9. Resistor 7 and its series-connected Zener diode 8 are connected directly across the regulated voltage supply mains with the base of transistor Q8 connected at their junction. Consequently, the base of transistor Q8 is held at a fixed voltage with reference to terminal 14. Feedback current through the emitter resistor 9 causes the current to change in transistor Q8 as the voltage on the base of transistor Q9 varies. The voltage on the base of transistor Q9 is initially adjusted by the potentiometer slider 11 of the voltage divider network 10, which network is also connected across the regulated voltage supply mains. It will be recognized that the circuit involving transistors Q8 and Q9 and their common resistor 9 comprises a well-known type of differential amplifier. An incremental voltage change on the base of transistor Q9 will cause an incremental change of current through its collector-emitter path and, by reason of the feedback connection, a substantially equal but opposite change of current takes place in the collector-emitter path of transistor Q8 with the result that the sum of the voltages V1 and V2 is kept substantially constant. As previously described with reference to the circuit of FIG. 1, these differential voltage changes will cause the widths of the output pulses at terminals 1 and 2 to vary differentially, their frequencies, however, remaining substantially constant.

During the time that a voltage pulse appears at output terminal 1, a transistor Q5 is caused to become conductive. Current is supplied to the collector-emitter path of transistor Q5 by reason of a connection from switch S through a resistor to its collector. The emitter of transistor Q5 is connected to the base of transistor switch Q7 so that, when transistor Q5 becomes conductive, it causes current to flow into the base of transistor Q7, thereby causing this switch to close. Transistor switch Q7 will remain closed so long as the pulse appears at output terminal 1. When the voltage at terminal 1 drops to zero, a voltage appears at output terminal 2, thereby supplying a current flow through an obvious path from terminal 2, through a resistor to the base of transistor Q6, through its base-emitter junction and back to the source E. When transistor Q6 is thereby made conductive, it places a low impedance across the base-emitter path of transistor Q7 to insure that this switch will remain open. It will now be apparent that transistor switch Q7 will be closed during the interval that an output pulse appears on output terminal 1 and will be open during the period that an output pulse appears on terminal 2. A regulation cycle may now be briefly described.

Assume that, for any reason, the terminal voltage across output terminals 13 and 14 should slightly lower. This will result in a lowering of the voltage on the base of transistor Q9 thereby reducing the current flowing to its collector and lowering the control voltage V2. By reason of the feedback action previously described, the current flowing to the collector of Q8 will correspondingly increase thereby increasing voltage V1. Referring momentarily to FIGS. 1 and 2, it will be evident that when voltage V1 is increased, the voltage $V_{b3}$ at the base of transistor Q3 is lowered. This results in the output voltage $e_{01}$ at terminal 1 becoming of longer duration and, consequently, regulator switch Q7 will be caused to remain closed for a longer period of time, thereby maintaining the level of the voltage at terminals 13 and 14. The reverse action obviously occurs should there be a momentary drift toward a higher voltage at output terminals 13 and 14.

The constant current means D1 and D2 shown in FIG. 1 may be any of a number of well-known means, but preferably they should comprise a constant current diode, for example, one obtained commercially and identified as the Motorola constant current diode MCL 1303. Alternatively, this means may be in the form of a transistor circuit, such as is shown in FIG. 2 of United States Pat. 3,182,267 granted May 4, 1965 to R. E. Myer. Again it may be a simple high resistance, although it is well known that the current characteristic obtainable with a simple high resistance is not as constant as when a diode or the transistor circuit is used. Where a simple resistor is used, a higher supply voltage than normal is required.

Figure 4:
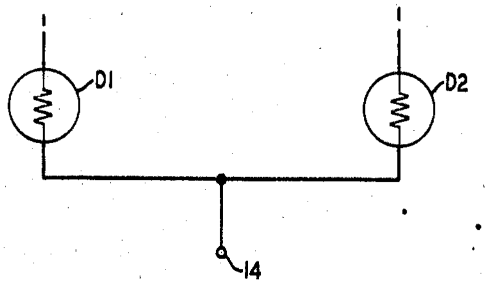
FIG. 4 shows an alternative circuit structure for the constant current means shown in FIG. 1 as particularly applied to FIG. 3.

In FIG. 4 the constant current devices D1 and D2 are represented as resistors. The lower terminals of these devices are to be connected to output terminal 14 of FIG. 3 rather than to conductor 4 as shown in FIG. 1. In this way, a higher supply voltage is obtained since the output voltage of the regulator is added in series with the source voltage E. The operation of the circuit otherwise is the same as previously described.

While this invention has been described with reference to some particular embodiments, it will be evident to those skilled in the art that various modifications may be made without departing from the scope of this invention.

What is claimed is:

1. A constant frequency amplitude-to-pulse width converter comprising first, second, third and fourth transistors each having a collector, an emitter and a base, a source of direct voltage having first and second terminals, the emitters of said first and said second transistors being connected to the first terminal of said source, first and second resistors connected, respectively, between the collectors of said first and second transistors and the second terminal of said source, a first capacitor and a first constant current means connected in series between the base of said first transistor and the second terminal of said source, a second capacitor and a second constant current means connected in series between the base of said second transistor and the second terminal of said source, first and second control voltage sources, means forming first and second series circuits, said first series circuit comprising said first control voltage source, the base-emitter path of said third transistor and said first capacitor and said second series circuit comprising said second control voltage source, the base-emitter path of said fourth transistor and said second capacitor, each of said series circuits being so arranged that current flows through its base-emitter path only when a voltage charge on its capacitor exceeds the voltage of its control voltage source, means connecting the collectors of said third and fourth transistors to the bases of said second and first transistors, respectively, and means for differentially varying said first and second control voltage sources so that the sum of their voltages is constant to produce rectangular, variable pulse width, voltage waveforms of opposite phase and of substantially constant frequency across said first and second resistors.

2. The combination of claim 1 and first, second, third and fourth diodes, said first diode being connected between the collector of said first transistor and the emitter of said fourth transistor, said second diode being connected between the collector of said second transistor and the emitter of said third transistor, said third diode being included in said first series circuit between said first capacitor and said first control voltage source, said fourth diode being included in said second series circuit between said second capacitor and said second control voltage source, the junctions between said third and fourth diodes and their respective first and second control voltage sources being connected to the first terminal of said direct voltage source.

3. The combination of claim 1 wherein said first and second constant current means each comprises a diode having a constant current characteristic.

4. The combination of claim 1 wherein said first and second constant current means each comprises a resistor connected in series with an additional direct voltage source poled to be series aiding to said first named source of direct voltage.

5. A constant frequency amplitude-to-pulse width converter comprising first and second transistors, each having an emitter, a base and a collector, a direct voltage source, means connecting said emitters to one terminal of said source, first and second resistors connected, respectively, between the collectors of said first and second transistors and a second terminal of said source, first and second constant current means, each having one of its two terminals connected to said second terminal of said source, a first capacitor connected between the base of said first transistor and the other terminal of said first constant current means, a second capacitor connected between the base of said second transistor and the other terminal of said second constant current means, third and fourth transistors, each having an emitter, a base and a collector, the emitter of said third transistor being connected to the junction between said first capacitor and said first constant current means, the emitter of said fourth transistor being connected to the junction between said second capacitor and said second constant current means, means connecting the collectors of said third and fourth transistors to the bases of said second and first transistors, respectively, a first diode connected between the collector of said first transistor and the emitter of said fourth transistor, a second diode connected between the collector of said second transistor and the emitter of said third transistor, third and fourth diodes connected between the bases and emitters of said first and second transistors, respectively, and means for applying differential control voltages between the bases of said third and fourth transistors and the emitters of said first and second transistors, whereby rectangular voltage waveforms of substantially constant frequency but of opposite phases will appear across said first and second resistors, the relative durations of which are under control of said means for applying the differential control voltages.

References Cited

UNITED STATES PATENTS

| | | | |
|---|---|---|---|
| 3,037,172 | 5/1962 | Biard | 332—14 |
| 3,445,788 | 5/1969 | Camenzind | 331—113 |

JOHN KOMINSKI, Primary Examiner

S. H. GRIMM, Assistant Examiner

U.S. Cl. X.R.

328—194, 200; 331—113, 182; 332—14